United States Patent
McGivern

[15] 3,669,271
[45] June 13, 1972

[54] SIPHON TYPE SLUDGE REMOVAL SYSTEM FOR A SEWAGE SETTLING TANK

[72] Inventor: Robert F. McGivern, 1404 Holly, Columbus, Ohio 43212

[22] Filed: Dec. 11, 1970

[21] Appl. No.: 97,078

[52] U.S. Cl............................210/128, 210/242, 210/527
[51] Int. Cl.......................................................B01d 21/24
[58] Field of Search...................210/104, 121, 128, 242, 527

[56] References Cited

UNITED STATES PATENTS

| | | | |
|---|---|---|---|
| 3,333,704 | 8/1967 | McGivern et al. | 210/527 X |
| 2,826,306 | 3/1958 | Burns | 210/128 X |

Primary Examiner—Jim L. DeCesare
Attorney—Mahoney, Miller & Stebens

[57] ABSTRACT

A siphon arrangement for removing sludge from the bottom of a sewage settling tank and discharging it into a sludge tank from which it is removed. The inlet of the siphon is submerged in the sewage adjacent the bottom of the settling tank and its outlet is submerged in the sludge discharged into the sludge tank. The siphon is carried by a float supported by the liquid in the settling tank, the level of which may vary as more or less sewage to be treated flows into the tank. The level of the sludge in the sludge tank will always be lower than the level of the liquid in the settling tank and it is important to the operation of the siphon to maintain constant this relationship of the levels of the liquids in the two tanks. This is accomplished by a control arrangement for controlling the discharge of the sludge from the sludge tank in accordance with variations in the level of the liquid in the settling tank.

8 Claims, 5 Drawing Figures

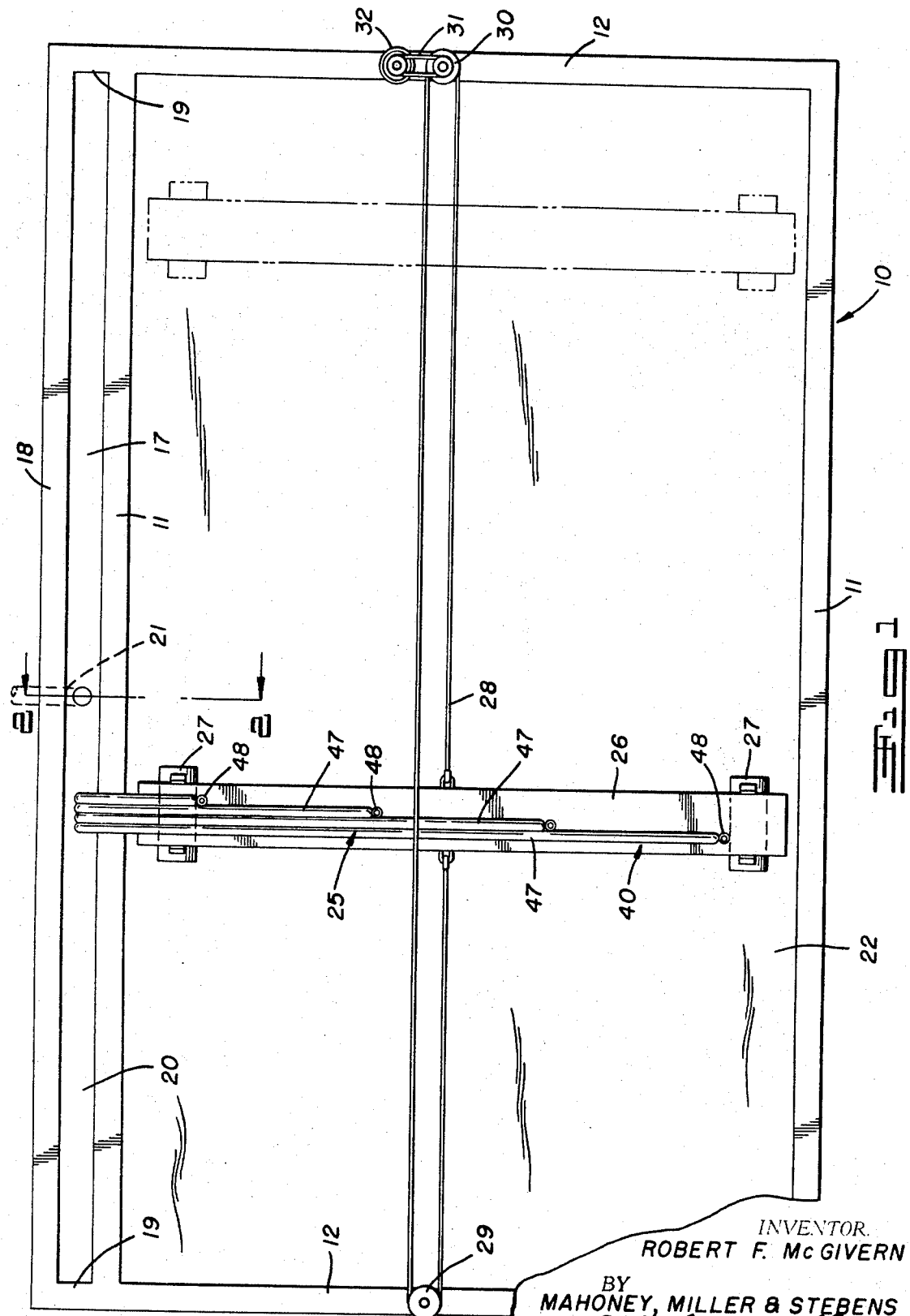

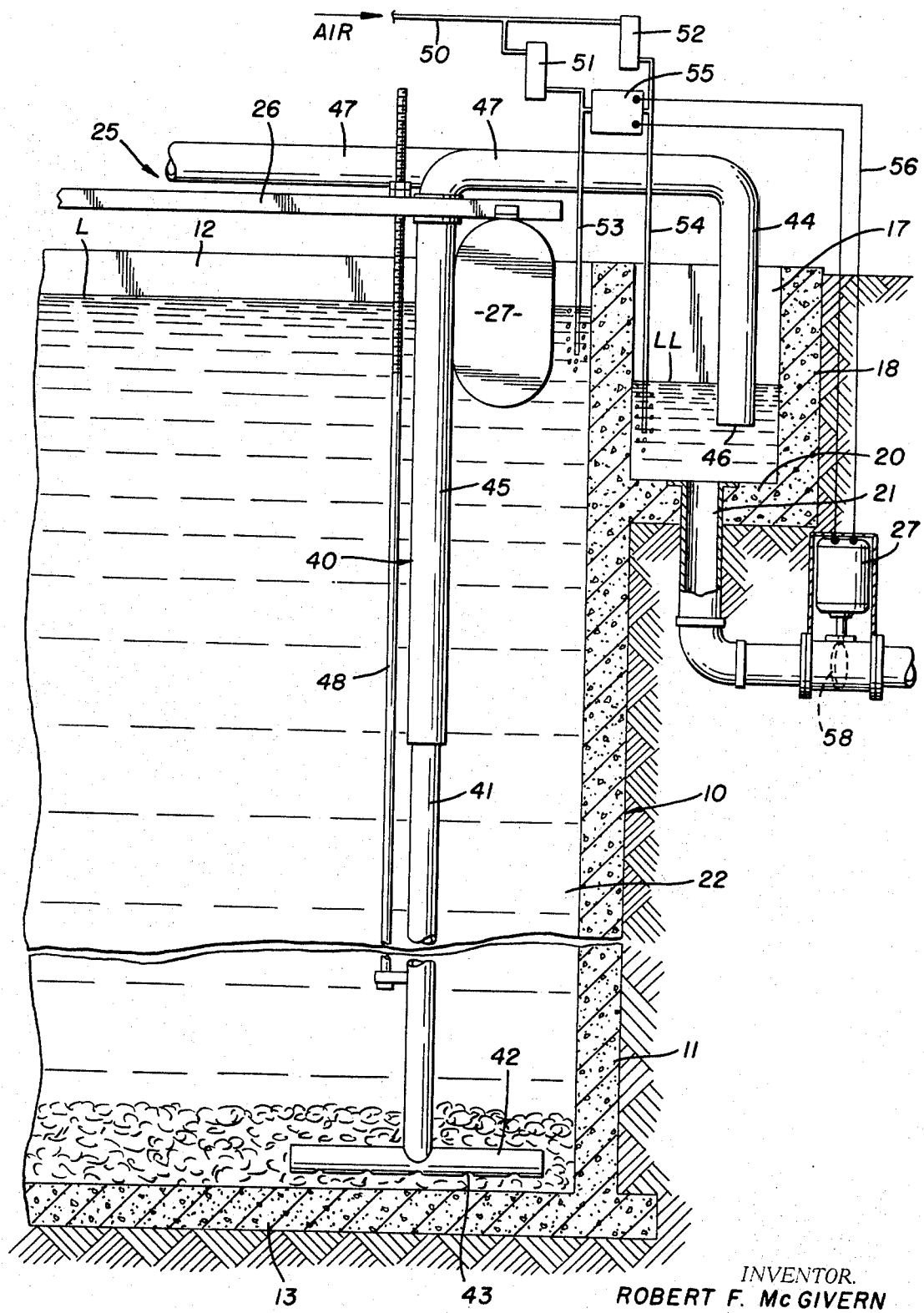

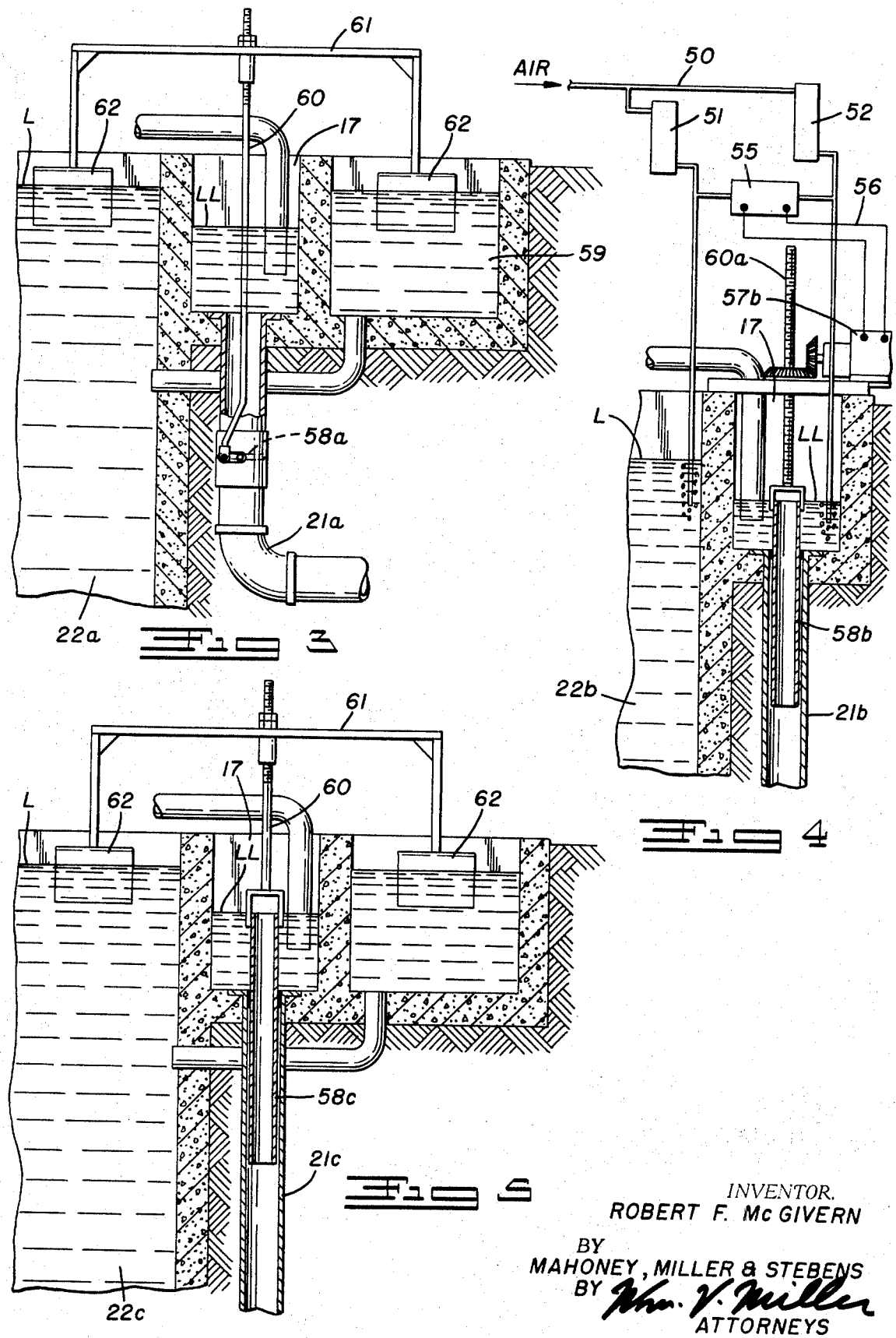

SIPHON TYPE SLUDGE REMOVAL SYSTEM FOR A SEWAGE SETTLING TANK

In Patent No. 3,333,704 to McGivern, et al., issued August 1, 1967, there is disclosed a siphon sludge removal system for a sewage settling tank of the type used in connection with the clarification processes of sewage or water treatment. According to that patent, the siphon was so supported that variations in liquid level in the settling or treatment tank would have no effect on the siphon system. The patent system employed a siphon having an inlet adjacent the bottom of the settling tank and an outlet in the sludge tank, the level of the liquid in the sludge tank being determined by the level of the siphon outlet which did not operate submerged but was upwardly directed, a liquid trap adjacent the outlet serving to prevent entrance of air to break the siphon. The siphon outlet was located at a constant distance below the level of the liquid in the settling tank, on which the siphon support floated, so as to maintain the vertical distance relationship of the levels of the liquids in the respective tanks constant, regardless of variations in the level of the liquid in the settling tank, which vertical distance is critical in proper operation of the siphon.

The present invention provides for the use of a similar floating siphon sludge removal system but one in which the discharge outlet of the siphon is submerged in the liquid in the sludge or siphon discharge tank and no trap is used at its discharge outlet. The submerged siphon outlet will move vertically in the liquid in the sludge tank in accordance with the vertical floating movement caused by variations in level of the liquid in the treating or settling tank. However, so that the siphon will operate properly, the vertical distance relationship of the level of the liquid in the settling tank and that in the sludge tank is maintained constant, by controlling the discharge of sludge from the sludge tank by an automatic control arrangement which responds to changes in the level of liquid in the settling tank.

The best modes contemplated in carrying out this invention are illustrated in the accompanying drawings in which:

FIG. 1 is a schematic plan view of a tank equipped with a floating siphon sludge removal system in accordance with my invention.

FIG. 2 is an enlarged transverse sectional view taken along line 2—2 of FIG. 1 and illustrating a differential pressure control system for controlling the discharge valve of the sludge tank to maintain the constant relationship of the level in that tank relative to the level in the main settling tank.

FIG. 3 is a similar view illustrating a float arrangement for controlling the discharge valve of the sludge tank for the same purpose.

FIG. 4 is a similar view showing a differential pressure control arrangement similar to FIG. 2, but a different type discharge valve for the sludge tank.

FIG. 5 is a similar view showing a float control arrangement similar to FIG. 3, but a different type discharge valve for the sludge tank.

With reference to the drawings, I have illustrated a tank system in FIGS. 1 and 2 similar to that disclosed in said patent. It comprises a large, elongated sewage-receiving tank 10 of rectangular cross-section. However, it is to be understood that the principles of this invention are not limited to a tank of this shape and that the siphon system disclosed herein may be applied to tanks of various shapes. The tank shown includes the upright vertical side walls 11, the opposed end walls 12, and the bottom 13. Tanks of this type are commonly provided with an inlet (not shown) for raw or other sewage usually at one end and an outlet (not shown) usually at the opposed end through which clarified or partially clarified liquid is discharged. Sometimes, the inlet and outlet are so arranged, as is well known in the art, that variations in the level of the liquid, indicated at L, in the settling chamber 22 of the tank can occur from time-to-time. For example, the outlet may include a vertically adjustable weir which may be set to determine the minimum level in the settling chamber 22 and over which the clarified liquid flows at varying levels depending upon the amount of sewage supplied to the tank through the inlet. Several of these treatment tanks may be connected in sequence.

A siphon outlet chamber or sludge chamber is associated with the tank and is illustrated as being an upwardly opening trough or channel 17 which extends the full length of the tank along one side wall 11 thereof and adjacent the upper edge thereof. This channel may have one of its side walls formed by the adjacent side wall 11 of the tank and the other upright side wall 18 extending longitudinally and parallel to the wall 12 and spaced laterally inwardly thereof. The ends are closed at 19 and the bottom 20 slopes in both directions so that there will be a gravity flow of sludge, discharged into the tank, toward an outlet line 21, intermediate the ends thereof, which leads to a suitable discharge point. The bottom 20 is always below the liquid level L of the tank. Other siphon outlet chamber arrangements may be provided as it is only important that the chamber 17 be out of communication with the settling chamber or main part 22 of the tank and it be so formed that is possible to have the level LL of the liquid therein at a level below the level L of the liquid in the settling tank. Obviously, the sludge liquid in the chamber or tank 17 will be of a thick viscous nature. The walls of the sludge chamber 17 will extend upwardly above the level L of the liquid in the settling tank 22.

As indicated in said patent, the siphon or siphons are supported on a floating carriage. This carriage is indicated at 25 and is shown as comprising a flat platform 26 which extends transversely substantially the full distance between the inner side wall 18 of the chamber 17 and the opposed side wall 11 of the tank 10. This platform 26 is carried by a suitable number, shown as a pair, of floats or pontoons 27 attached beneath the opposed ends thereof.

The carriage 25 is adapted to be floated back and forth over the surface L of the liquid in the tank so that it will repeatedly traverse the full length of the tank. It may be moved back and forth by the arrangement shown or some other suitable arrangement. In the arrangement shown, a cable 28 is attached at the front and back edges respectively of the platform 26 and is looped around an idler sheave 29 mounted on the upper edge of one of the end walls 12 and a driven sheave 30 mounted on the upper edge of the other end wall 12. The sheave 30 is driven by a chain drive 31 from a suitable electric motor 32. The motor 32 is preferably of the variable speed, reversible type and may be controlled by a suitable circuit. As explained in said patent, it is desired that the motor controls be capable of moving the carriage 25 along the length of the tank at a varying rate of speed.

One or more siphons and preferably a plurality of siphons are provided, according to my invention, for removing the sludge from the bottom of the settling chamber 22 of the tank 10 and each is indicated generally by the numeral 40. All of these siphons are mounted on and are carried by the carriage 25 for movement longitudinally of the tank therewith so as to be moved along the full length of the tank.

Each siphon 40, as shown in FIG. 2, comprises a depending pipe or tube 41 which is of inverted T-form having the inlet lower branch 42 horizontally disposed and located just above the bottom 13 of the tank. This inlet branch 42 is provided with downwardly opening sludge inlets 43 spaced along its length through which the sludge may be drawn inwardly into the siphon. Each branch 42 of a siphon will extend over only a portion of the width of the tank bottom 13 but as disclosed in said patent, the siphons are provided in sufficient number with the branches so arranged that the entire width of the bottom will be covered by the inlet branches of the siphons. Thus, sludge will be removed from the full width of the bottom, and since the carriage is moved from end-to-end of the tank, from the full length of the bottom.

Each siphon 40 also includes a vertically disposed pipe or tube 44 which extends downwardly into the trough 17 and a vertically disposed section 45 extending downwardly into the tank chamber 22 connected by a laterally extending section 47. Tube portion 44 can move along in the trough 17 as the carriage 25 moves along the tank 10. According to the present invention, the lower extremity of the depending tube portion 44 provides the siphon outlet 46 which is always submerged in the liquid in the trough 17 and below the level L of the liquid in the chamber 22. The pipe sections 47 of the various siphons are of varying lengths to locate the depending sections 45 in proper lateral positions to position the inlet pipes 41 carried thereby properly relative to the bottom 13 of the tank 10. Each pipe section 41 preferably has an adjustment, such as a telescopic adjustment, whereby the level of the horizontal inlet branch 42 may be adjusted relative to the tank bottom 13. This adjustment may be accomplished by means of a screw 48 which extends upwardly through the platform 26 so that it is readily accessible above the level L of the liquid in the tank.

With this arrangement, the sludge is removed from the bottom 13 of the tank as it accumulates thereon by means of a siphon action. Each siphon 40 may be started in a suitable manner such as by applying vacuum at the outlet or discharge end thereof. The siphons 40 are moved along with the carriage 25 from the inlet end of the tank toward the outlet end thereof with varying speed. As disclosed in said patent, this speed is selected in accordance with the rate of deposit of the sludge on the bottom 13 of the tank and which, in accordance with Stokes' law, will vary with the rate of flow of the sewage away from the inlet and the specific gravity of the solids carried thereby. The vertical position of the bottom 20 of the sludge trough 17 relative to the normal liquid level L will be selected in accordance with the nature of the raw sewage being treated. For example, if the solids in the sludge are of relatively high specific gravity, it is desirable to have the bottom 20 relatively low and the siphon discharge outlet end 46 relatively low so that a higher velocity flow through the siphon will result and the higher flow will result in more effective removal of the high specific gravity materials. Conversely, if the sludge material is of low specific gravity, a lower velocity flow will be sufficient to remove the sludge materials and, therefore, the bottom 20 of the trough can be at a higher level. For example, if the sludge has a high grit content, it may be desirable to have the bottom 20 at a level corresponding to about one-half to one-quarter the depth of the liquid therein to maintain a high velocity flow through the siphons to remove effectively the high specific gravity grit. The siphon inlet branches 43 will move along the bottom 13 and will cover substantially the entire width of the bottom and this movement longitudinally will be at a varying speed in accordance with the varying amount of deposit of solids along the bottom. The sludge, which is semi-liquid, will be drawn up through the inlet openings 43 by each siphon 40 and be discharged from the siphon outlet 46 as it moves along the sludge trough 17. Breaking of the siphon by air entering trough through the siphon outlet 46 will be prevented since it is always submerged. The sludge discharged into the trough 17 will flow towards the discharge or outlet 21 thereof. The effect of each siphon can be varied by changing the speed of movement of the carriage 25 and by varying the level of the siphon outlet 46 relative to the liquid level L in the main settling chamber or tank 22. Some variations can be brought about by varying the level of the inlet branches 42. As indicated above and in said patent, the level of the liquid L in the main chamber 22 will vary as more or less sewage to be treated flows into that chamber. However, the vertical distance from the level L down to the siphon outlet 46 will always be constant. This is due to the fact that the carriage 25 is carried on floats so that the carriage will move vertically in accordance with the variation in the level of liquid in the main tank, the lowest level of which is determined by the setting of its outlet, but since the siphon discharge outlet 46 is a fixed distance below the carriage, there will be no variation in the level of it relative to the liquid level L.

It is important to the proper operation of the siphon to maintain constant the vertical relationship of the level L of the liquid in the settling chamber 22 to that of the lower level LL of the sludge liquid in the chamber or tank 17. In other words, it is important to maintain substantially constant, the vertical distance from the level LL to the level L and since the level L varies from time-to-time, the discharge of the sludge from the chamber 17 is automatically controlled according to my present invention in response to variations in the level L to vary the level LL. This control results in a substantially constant vertical distance between the levels L and LL with the result that the siphon will function properly and continuously. It will be understood that variation in the level L will be within limits which will depend on the level of the bottom 20 of the chamber 17, since the siphon outlet 46 should not contact with the bottom 20.

One arrangement for automatically varying the discharge from the chamber 17 in accordance with variations in the level L, is illustrated in FIG. 2. This control results from variations in the head pressures of the liquids in the respective chambers 22 and 17, resulting from relative variations in the levels L and LL. The control system comprises an air supplying tube 50, for receiving air under pressure, which is connected to a pair of 0.1 cubic feet per minute flow control valves and designated 51 and 52, respectively. The valve 51 is connected to a line 53 which has an outlet that will always be submerged in the liquid in the chamber 22 regardless of variations in the level L. Similarly, the valve 52 is connected to a line 54 which has an outlet that will always be submerged in the liquid in the chamber 17 regardless of variations in the level LL. Between the lines 53 and 54, a differential pressure switch control valve 55 is connected and this switch has its electrical contacts connected by wires 56 to an electric motor 57. The motor 57 controls the opening and closing of a butterfly type valve 58 provided in the outlet or discharge line 21 for the sludge chamber 17. Thus, the sludge discharge valve 58 will be opened and closed in accordance with variations in the level L to vary the level LL. The relationship of the level L to the level LL will therefore be maintained substantially constant.

In FIG. 3, a float and mechanical control arrangement is shown provided for controlling the butterfly type valve 58a located in the discharge line 21a. This valve is actuated by a rod 60 connected to a frame 61 carried by a pair of floats 62. These floats are supported by the liquid in the settling tank 22a and an extension 59 thereof. As the level L of the sewage being treated in the chamber 22a drops, the rod 60 moves vertically to open and close the valve 58a and, therefore, to maintain substantially constant, the relationship of the levels L and LL.

In FIG. 4, a differential pressure control arrangement like that shown in FIG. 2 is illustrated for controlling a different type of valve 58b provided in the sludge discharge line 21b for the trough 17. The differential pressure arrangement controls the electric motor 57b which operates a vertical screw 60a. This screw controls the vertical position of the valve sleeve 58b which is in the form of a pipe telescoping downwardly into the line 21b. The upper end of this valve determines the level LL in the trough 17 and is automatically varied in accordance with the variations in the level L in the settling chamber 22b.

The arrangement in FIG. 5 accomplishes the same control and comprises a valve 58c in the discharge line 21c, the valve being the same as the valve 58b of FIG. 4. The vertical position of the valve 58c is controlled by a float arrangement 60–61 exactly like that shown in FIG. 3. This control arrangement will also result in maintenance of the relationship of the level LL of the chamber 17 to the level L of the chamber 22c.

It will be apparent from the above description that this invention provides a simple and inexpensive system for removing settling or sludge from a liquid to be clarified which employs a siphon arrangement that is not effected by variations in the level of liquid in the settling chamber of the tank.

Having thus described my invention, what is claimed is:

1. A liquid clarification system comprising a settling chamber having inlet and outlet means arranged to permit settling of a sludge on the chamber bottom from liquid in the chamber and arranged to permit variations in the liquid level in the chamber, a siphon for removing the sludge from the bottom of the chamber and comprising a conduit having an inlet adjacent the bottom of the chamber and an outlet, a second chamber independent of the first chamber in which the siphon outlet is located and having a bottom located so that it is always below the level of the liquid in the first chamber, said second chamber having a discharge outlet for sludge which is discharged thereinto, controlled by a discharge valve, means for supporting said siphon comprising a support which floats in the liquid in the first chamber so as to maintain constant the vertical distance relationship between the level of the siphon outlet and the level of the liquid in the first chamber regardless of variations in the liquid level in that chamber so as to remove the sludge deposited on the chamber bottom without disturbing said vertical distance relationship between said liquid level and said siphon outlet level, said siphon outlet being submerged below the level of the liquid in the second chamber, and means for controlling said discharge valve of the second chamber in response to changes in level of the liquid in said first chamber to change the level of the liquid in the second chamber so as to maintain substantially constant the vertical distance between the levels of the liquids in the two chambers.

2. A system according to claim 1 in which said discharge valve comprises a movable valve which controls the discharge flow from said discharge outlet of the second chamber, and said controlling means comprises means for moving said valve in response to changes in level of the liquid in said first chamber.

3. A system according to claim 2 in which said valve moving means comprises an electric motor, a differential pressure activated electric switch electrically connected to and controlling said motor, and fluid lines connected to said pressure switch and to the respective chambers for subjecting the switch to the different pressures in the respective chambers.

4. A system according to claim 2 in which said controlling means comprises a float device subjected to the level of liquid in said first chamber, and an operative connection between said float device and said valve.

5. A system according to claim 4 in which said operative connection is a mechanical connection.

6. A system according to claim 1 in which said first chamber is provided in a tank, said second chamber being in the form of a channel extending across the tank, said channel having a bottom which inclines toward said sludge discharge outlet so that there will be gravity flow of the sludge to and through said outlet, said siphon outlet being positioned above said second chamber bottom at all levels of the liquid in said first chamber.

7. A system according to claim 6 in which a plurality of said siphon conduits are provided with their inlets located at laterally spaced positions in said first chamber along the bottom of the tank, all of said siphon conduits being supported by a carriage for movement across the tank with their inlets moving along the bottom of the tank and with their outlets movable through said channel.

8. A system according to claim 7 in which each siphon conduit is provided with means for adjusting the level of its inlet relative to the bottom of the tank.

* * * * *